US008611753B2

(12) United States Patent
Lo et al.

(10) Patent No.: US 8,611,753 B2
(45) Date of Patent: Dec. 17, 2013

(54) OPTICAL ROTARY JOINTS, METHODS OF MOUNTING SAME IN A PROPERLY-ALIGNED MANNER, AND OPTICAL REFLECTOR ASSEMBLIES FOR USE THEREIN

(75) Inventors: K. Peter Lo, Blacksburg, VA (US); Norris E. Lewis, Christiansburg, VA (US); Heath E. Kouns, Pearisburg, VA (US); Martin J. Oosterhuis, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 13/507,043

(22) Filed: May 31, 2012

(65) Prior Publication Data

US 2012/0279035 A1   Nov. 8, 2012

Related U.S. Application Data

(62) Division of application No. 11/658,434, filed as application No. PCT/US2006/016377 on Apr. 28, 2006, now Pat. No. 8,285,146.

(51) Int. Cl.
*H04B 10/00* (2013.01)

(52) U.S. Cl.
USPC ............. 398/114; 29/407.01; 29/407.04; 29/407.09; 29/407.1; 385/65; 385/83

(58) Field of Classification Search
USPC ......... 29/407.01, 407.04, 407.09, 407.1, 464, 29/467; 385/26, 33, 15, 74, 65, 83; 398/114; 359/200.1–200.5
See application file for complete search history.

(56) References Cited

U.S. PATENT DOCUMENTS

| | | | | |
|---|---|---|---|---|
| 4,058,699 A * | 11/1977 | van Vloten | 219/121.73 |
| 4,109,997 A * | 8/1978 | Iverson | 385/26 |
| 4,436,367 A * | 3/1984 | Lewis et al. | 385/26 |
| 4,492,427 A * | 1/1985 | Lewis et al. | 385/26 |
| 4,525,025 A * | 6/1985 | Hohmann et al. | 385/26 |
| 4,555,631 A * | 11/1985 | Martens | 250/551 |
| 4,643,521 A * | 2/1987 | Harstead et al. | 385/26 |
| 5,039,193 A * | 8/1991 | Snow et al. | 385/25 |
| 5,078,466 A * | 1/1992 | MacCulloch | 385/26 |
| 5,157,745 A * | 10/1992 | Ames | 385/26 |
| 5,229,871 A * | 7/1993 | Czarnek et al. | 359/15 |
| 5,442,721 A * | 8/1995 | Ames | 385/26 |
| 5,553,176 A * | 9/1996 | DeMarco, Jr. | 385/26 |
| 5,901,605 A * | 5/1999 | Oosterhuis et al. | 74/15.2 |
| 5,970,808 A * | 10/1999 | Oosterhuis et al. | 74/15.2 |
| 5,991,478 A * | 11/1999 | Lewis et al. | 385/26 |
| 6,104,849 A * | 8/2000 | Lewis et al. | 385/26 |
| 6,128,426 A * | 10/2000 | Einhorn | 385/25 |
| 6,453,088 B1 * | 9/2002 | Lewis et al. | 385/25 |
| 6,907,161 B2 * | 6/2005 | Bowman | 385/26 |
| 6,980,714 B2 * | 12/2005 | Lo et al. | 385/26 |
| 7,239,776 B2 * | 7/2007 | Oosterhuis et al. | 385/25 |
| 7,515,782 B2 * | 4/2009 | Zhang et al. | 385/26 |
| 8,195,051 B2 * | 6/2012 | Lindorfer | 398/114 |
| 8,285,146 B2 * | 10/2012 | Lo et al. | 398/114 |
| 8,320,765 B2 * | 11/2012 | Fujimoto et al. | 398/114 |
| 2002/0117067 A1 * | 8/2002 | Fischer et al. | 101/463.1 |

(Continued)

*Primary Examiner* — Jermie Cozart
*Assistant Examiner* — Bayan Salone
(74) *Attorney, Agent, or Firm* — Phillips Lytle LLP

(57) ABSTRACT

The present invention relates generally to optical rotary joints (35) for enabling optical communication between a rotor and a stator, and to improved methods of mounting such optical rotary joints on supporting structures such that the rotor and stator remain properly aligned.

2 Claims, 8 Drawing Sheets

(56) References Cited

U.S. PATENT DOCUMENTS

| | | | |
|---|---|---|---|
| 2002/0183622 A1* | 12/2002 | Zuluaga et al. | 600/476 |
| 2005/0036735 A1* | 2/2005 | Oosterhuis et al. | 385/26 |
| 2005/0069249 A1* | 3/2005 | Lo et al. | 385/26 |
| 2006/0257077 A1* | 11/2006 | Oosterhuis et al. | 385/74 |
| 2011/0026938 A1* | 2/2011 | Lo et al. | 398/202 |
| 2012/0280115 A1* | 11/2012 | Lo et al. | 250/216 |

* cited by examiner

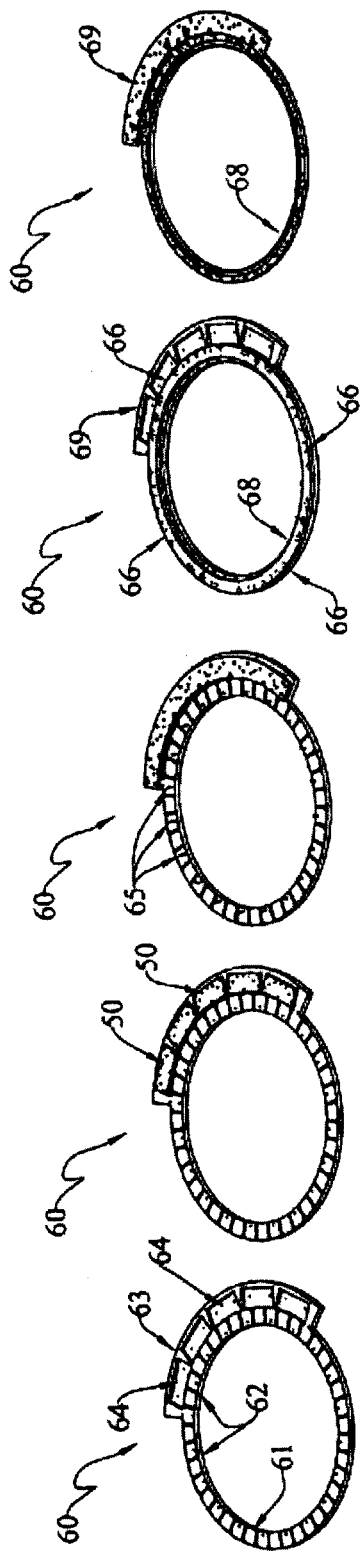

OPTICAL ROTARY JOINTS, METHODS OF MOUNTING SAME IN A PROPERLY-ALIGNED MANNER, AND OPTICAL REFLECTOR ASSEMBLIES FOR USE THEREIN

TECHNICAL FIELD

The present invention relates generally to optical rotary joints for enabling optical communication between a rotor and a stator, to improved methods of mounting such optical rotary joints on supporting structures such that the rotor and stator remain properly aligned, and to improved optical reflector assemblies for use in such optical rotary joints.

BACKGROUND OF THE INVENTION

This invention provides improvements to various communication devices described in U.S. Pat. No. 6,980,714, dated Dec. 27, 2005, to K. Peter Lo and Norris E. Lewis, entitled "Fiber Optic Rotary Joint and Associated Reflector Assembly". The communication devices described in the '714 patent are capable of transmitting data and/or power (hereinafter sometimes jointly and severally referred to as "communication") across a rotary interface, such as between a rotor and a stator.

For example, computed tomography (CT) scanners require data transmission across a rotary interface. In order to enable such data transmission, slip rings are commonly employed. A slip ring has a rotating element that rotates with the rotor, and a stationary element affixed to the stator. Slip rings were originally designed to support electrical communication between the rotor and stator. However, as data rates increased, electrical transmission of the data became impractical. Optical rotary joints were then developed to support higher data transmission rates across the rotary interface. Optical communication is capable of transmitting data at much higher rates than prior electrical communication techniques.

Previous techniques in optical communication across a rotary interface have included the use of waveguides (see, e.g., U.S. Pat. No. 6,453,088, dated Sep. 17, 2002, to Norris E. Lewis, Anthony L. Bowman and Robert T. Rogers, entitled "Segmented Waveguide for Large Diameter Fiber Optic Rotary Joint"; U.S. Pat. No. 6,104,849, dated Aug. 15, 2000, to Norris E. Lewis, Anthony L. Bowman, Robert T. Rogers and Michael P. Duncan, entitled "Fiber Optic Rotary Joint"; and U.S. Pat. No. 5,991,478, dated Nov. 23, 1999, to Norris E. Lewis, Anthony L. Bowman, Robert T. Rogers and Michael P. Duncan, entitled "Fiber Optic Rotary Joint"), optical fibers (see, e.g., U.S. Pat. No. 6,650,843, dated Nov. 18, 2003, to Georg Lohr, Markus Stark and Hans Poisel, entitled "Device for the Optical Transmission of Signals"), and free space propagation (see, e.g., Japanese Pat. Pub. No. 09-308625, dated Feb. 12, 1997, to Suzuki Tatsuro, Teimoshii Aari Fuotsukusu and Tomu Haatofuoodo, entitled "Optical Transmission System"). The aggregate disclosures of these references are hereby incorporated by reference with respect to the structure and operation of such prior art optical rotary joints.

In CT scanner applications, in which the axis of rotor rotation is sometimes physically occupied by a patient, off-axis rotary joints are generally employed to transmit signals between the rotor and stator. Such off-axis rotary joints generally include one or more light sources for emitting the optical signals, and arcuate reflectors having channel-shaped transverse cross-sections that receive such transmitted signals and direct such received signals to respective light receivers. The optical sources are spaced circumferentially about one of the rotor and stator, while the reflectors and receivers are spaced circumferentially about the other of the rotor and stator. The optical sources may include one or more common light sources, the optical signals from which are directed, as by optical fibers, to the periphery of the associated one of the rotor and stator, or may be separate emitting elements mounted about such periphery. For example, the optical sources may be disposed circumferentially about the rotor, while the multiple reflectors and receivers may be disposed circumferentially about the stator, thereby supporting optical communications from the rotor to the stator. In most cases, the path of optical data transmission across the rotary joint (i.e., between the rotor and stator) is in a radial direction with respect to the rotor axis. In other words, if light is transmitted from the rotor to the stator, the light is seen as coming from the rotor axis, for example, regardless of the physical location of the light source(s).

In operation, each of the light sources may possibly transmit the same optical signal. These signals may be transmitted across the rotary interface, and may be received by one or more of the reflectors and be directed to the associated receivers, depending upon the angular position of the rotor relative to the stator. In other embodiments, different optical signals may be transmitted from different light sources, or may be multiplexed if coming from the same source.

While generally effective for permitting optical communication between a rotor and a stator, conventional off-axis rotary joints that employ such arcuate reflectors with channel-shaped cross-sections suffer from several shortcomings, especially at higher data transmission rates. These problems include: (a) the broadening of superimposed pulse widths due to different-length light transmission paths, and (b) that a greater number of light sources must be used when transmitting signals into the entrance end of an optical fiber than when such signals are incident directly upon a photodetector, as discussed infra.

For example, in conventional off-axis rotary joints, the optical signals may travel along different-length paths between the various sources and the respective receivers, thereby introducing time delays in the various received optical signals, when superimposed. A particular receiver might receive signals from two circumferentially-adjacent optical sources. If the same optical signal is simultaneously emitted by the two adjacent sources, but such signals travel different distances to reach the receiver, the signals will be received at different times. Accordingly, the two signals will be out-of-phase, and the pulse width of the superimposed signals, as seen by the receiver, will be effectively broadened. To support communication at the desired high data rates, conventional offaxis rotary joints have been specifically designed to have less spacing between the optical sources and the receivers so as to minimize the path lengths of signal travel. Even so, it is difficult to support error-free data transmission at a data rate above 1.25 Gbit/sec, where the signals travel along different-length paths.

The aforesaid '714 patent discloses an optical rotary joint and an associated reflector assembly to provide optical communication between a rotor and a stator. By designing the optical rotary joint such that the optical signals travel along paths of equal path, the pulse width of the superimposed optical signals, as seen by the receiver, will not be increased.

To effect this, the '714 patent contemplates that the rotary joint include a reflector assembly having a concave elliptical reflecting surface, and possibly a hyperbolic reflecting surface as well. Both shapes are conic-section curves in a Cartesian plane (i.e., defined by the x-y axes) defined by the general equation:

$$Ax^2 + Bxy + Cy^2 + Dx + Ey + F = 0$$

where A, B, C, D, E and F are constants. For an ellipse, $B^2<4AC$; for a hyperbola, $B^2>4AC$. For an ellipse, the sum of the distances from any point on the curve to the two focal points ($F_1$, $F_2$) is a constant. If the reflecting surface is configured as a portion of an ellipse, light issuing from one focal point will be reflected by such elliptical reflecting surface toward the other focal point. However, the total length of the path of light traveling from one focal point to the other will be a constant, regardless of the specific location of the point on the elliptical reflecting surface on which the emitted light is incident. Conversely, for a hyperbolic reflecting surface, the difference between the distances from any point on the curved reflective surface to the two fixed focal points is a constant.

The '714 patent discloses several different optical configurations. In some of these, the received signals are focused directly on a photodiode. In other configurations, the reflected signals are focused on the entrance end of an optical fiber that communicates with a photodiode at a remote location. In still other configurations, a focusing lens is positioned at the entrance end to direct the received signals into the optical fiber.

However, the acceptance angle of an optical fiber is more limited than that for a photodiode. The main reason for this is that an optical fiber has a more limited numerical aperture (NA), than does a photodiode. The more-limited NA of an optical fiber restricts the approach angle at which light can be directed and guided into the fiber. This, in turn, limits the design of the reflective surfaces by means of which light may be directed toward the entrance end of the receiving fiber. This limitation requires, as a practical matter, that a greater number of light sources be used when the transmitted signals are to be directed initially into an optical fiber, than when such signals are incident directly on a photodetector.

Referring now to the drawings, FIGS. 1 and 2 of the present application correspond substantively to FIGS. 1 and 2 of the '714 patent, except for the differences in the reference numerals. Thus, these figures disclose a prior art optical rotary joint, generally indicated at 20, in which the various light sources 21 are mounted on the rotor 22. The optical beams are directed radially outwardly, as if they were coming from focal point $F_1$ at the rotor's axis of rotation. The beams are incident on the elliptical reflecting surface 23 of reflector 24, and are reflected backwardly toward the conjugate focal point $F_2$. However, such reflected beams are incident on, and are re-reflected forwardly by, hyperbolic reflecting surface 25 positioned between the elliptical reflecting surface and the back focal point B, and such forwardly-reflected beams are focused on receiver 26 which is located at the conjugate focal point C. The back focal point B of hyperbolic reflecting surface 25 is coincident with conjugate focal point $F_2$ of elliptical reflecting surface 23.

The '714 patent discloses an optical rotary joint that allows the transmission of high bandwidth optical signals from the rotor to the stator, and vice versa. In the scenario in which optical signals are transmitted from the rotor to the stator, a number of light sources are spaced evenly around the periphery of the rotor. The number of light sources required for continuous transmission of data across the rotary interface depends on the acceptance angle, θ, of the elliptical reflector. The acceptance angle δ is defined as the angle of the elliptical reflective surface, measured from the center of the rotor within which the light rays from the source can be directed and guided into the receiver. The acceptance angle θ is a function of the optical path length and the acceptance angle φ of the receiving fiber or photodetector (as appropriate), where:

$$\phi = 2 \times \sin^{-1}(NA)$$

To insure that optical communications can be continuously transmitted, at least one optical source has to be within the acceptance angle of the elliptical reflector at all relative angular positions of the rotor and stator. For example, if the receiving fiber has an NA of 0.37, the acceptance angle φ of this configuration is 13.6°, as shown in FIG. 3. Beyond the limits of this acceptance angle, the optical signals simply attenuate in the cladding layer of the fiber, and do not reach the photodetector. To populate the rotor circumference with evenly-spaced light sources such that at least one source is within the acceptance angle of the receiving fiber at all such relative angular positions, at least twenty-seven sources are required (i.e., 360°/13.6°=26.47 27 sources).

On the other hand, if a photodetector is used as the receiver, and if the photodetector has an NA of 0.74 such that its acceptance angle φ is widened to 32°, then only twelve circumferentially-spaced light sources are needed to populate the rotor so as to assure continuous communication (i.e., 360°/32°=11.25≈12 sources). Depending on the particular design of the photodiode package, the acceptance angle can be as high as 140° (NA=0.94).

Thus, to reduce the number of sources and to reduce cost and system complexity, it would be more advantageous to have the received signals are incident directly on a photodetector, rather than be first directed into the entrance end of an optical fiber for transmission therealong to a remotely-located photodetector. Moreover, a shorter path length to the photodetector is also desirable to reduce angular tolerance issues in a production environment.

Referring now to FIG. 4 of the present application, which substantively corresponds to FIG. 4 of the '714 patent except for the differences in the reference numerals, the '714 patent also discloses an embodiment, generally indicated at 28, in which a single elliptical reflector 29 is used (i.e., without a cooperative hyperbolic reflector), and the conjugate focal point $F_2$ lies radially outside of the rotor. In this arrangement, reflector 29 has an elliptical reflective surface 30 operatively arranged to focus the beams emanating radially outwardly from sources 31 into the entrance end of an optical fiber 32 that communicates with a remotely-located photodetector (not shown). The entrance end of the optical fiber is coincident with the conjugate focal point $F_2$ of the elliptical reflector.

If the reflected light is directed into optical fiber 32, the limited NA of the receiving fiber again requires that a large number of light sources to be spaced equally about the circumference of the rotor. For example, when the NA of the fiber is 0.37, using geometrical analysis, the acceptance angle of the reflector, θ, is 9.7°, with an optical path length of 210 mm from the edge of the rotor to the receiver. To populate the rotor such that continuous transmission of data from the rotor to the stator is assured, at least thirty-eight light sources are required (i.e., 360°/9.7°=37.11≈38 sources).

These two examples demonstrate that when the reflected light beams are incident directly on a receiver having a larger NA, such as a photodetector as opposed to the entrance end of an optical fiber leading to the receiver, the number of light sources, and hence the cost and complexity of the system, may be reduced.

While the fiber optic rotary joint in the '714 patent can enable high data trans-mission across a rotary interface, it would be desirable to provide improved versions of such constant-path-length fiber optic rotary joints that are capable of transmitting optical signals at rates greater than about 1.25 Gbit/s, that have lower insertion losses, that are more compatible with the use of optical fibers leading to remote receivers, that use smaller numbers of light sources, and that have minimum optical path lengths

DISCLOSURE OF THE INVENTION

With parenthetical reference to the corresponding parts, portions or surfaces of the disclosed embodiment, merely for purposes of illustration and not by way of limitation, the present invention broadly provides improved optical rotary joints, improved methods of mounting such optical rotary joints on supporting structure, and improved optical reflector assemblies for use in such optical rotary joints.

In a first aspect, the invention provides an improved optical rotary joint (35) for enabling optical communication between a rotor and a stator, the rotor having a longitudinal axis, comprising: at least one optical source (36) mounted on one of the rotor and stator for transmitting an optical signal in a radial direction with respect to the longitudinal axis of the rotor; at least one first reflector (38) mounted on the other of the rotor and stator for reflecting the optical signal transmitted from the source, the first reflector comprising a concave first reflective surface (44), a line (L) in a plane taken through the first reflective surface being configured as a portion of an ellipse having first and second focal points ($F_1$, $F_2$), the first focal point being positioned substantially coincident with the rotor axis; a second reflector (39) having a second reflective surface (45) configured as a portion of a cone and positioned at the second focal point of the elliptical surface for receiving light reflected from the first reflective surface and for reflecting light in a different direction as a function of the apex angle of the second reflective surface; and a receiver (40) arranged to receive light reflected by the second reflective surface.

In the preferred form, the first reflective surface (44) is configured and arranged such that the area of light that is incident on the second reflective surface is smaller than the area of light that is incident on the first reflective surface. Preferably, the light reflected from the first reflective surface is focused on a spot on the second focal point, $F_2$. The first reflective surface may be configured as a portion of an ellipsoid. As used herein, an ellipsoid is defined as being a geometric surface, all of whose plane sections are either ellipses or circles.

A first plurality of the optical sources may be mounted on the one of the rotor and stator, and a second plurality of the first reflectors are mounted on the other of the rotor and stator. The first and second pluralities may not be the same.

The improved optical rotary joint may further include: an optical fiber (41) having an entrance end and an exit end. The entrance end may be arranged at, or proximate to, the second focal point. The receiver may be arranged at, or proximate to, the exit end. The receiver may be a photodiode.

The improved rotary joint may further include: a lens assembly (40) arranged proximate the second focal point adjacent to the entrance end for guiding light into the optical fiber (41). This lens assembly may include a series of lenses, such as two plano-convex lenses, a lens and a holographic element, etc.

The improved rotary joint may further include: a prism for further changing the direction of the light rays reflected by the second reflective surface.

Preferably, a light ray traveling from the source to the receiver has a substantially constant path length regardless of the relative angular position between the rotor and stator. Moreover, the operation of the optical rotary joint is desirably independent of both the wavelength of the optical signal and the data rate of the signal.

Intensity variations of light falling incident on the receiver, are reduced to meet the dynamic range limitations of the receiver. The second reflective surface may have an apex angle of about 45°.

In the preferred embodiment, the optical signals are transmitted in a plurality of data channels. The maximum transmission data rate of the optical rotary joint is the sum of the number of channels times the maximum data rate per channel. Each channel may be capable of transmitting data at rates of 5.0 Gbit/sec or more. In one particular form having sixteen channels, the maximum data rate is on the order of about 80 Gbit/sec.

The second reflective surface may be conical.

The improved joint may further include a crosspoint switch having N inputs and M outputs and/or multiple light sources having different wavelengths, with the optical signals being wavelength division multiplexed.

In another aspect, the invention provides: an optical rotary joint (35) for enabling optical communication between a rotor and a stator, the rotor having a longitudinal axis, comprising: at least one optical source (36) mounted on one of the rotor and stator for transmitting an optical signal in a radial direction with respect to the longitudinal axis of the rotor; at least one first reflector (38) mounted on the other of the rotor and stator for reflecting the optical signal transmitted from the source, the first reflector comprising a first reflective surface (44), a line (L) in a plane taken through the first reflective surface being configured as a portion of an ellipse having first and second focal points ($F_1$, $F_2$), the first focal point being positioned substantially coincident with the rotor axis; a receiver (48, 49) arranged to receive light; and at least one light guide (47) having an entrance end positioned proximate the second focal point and having an exit end, and wherein the light guide includes a fiber array including a bundle of optical fibers having closely-adjacent entrance ends positioned proximate the second focal point and having exit ends, and wherein the fiber array is operatively arranged to guide light toward the receiver.

In this form, the entrance ends may have a convex shape. The second focal point may be arranged interiorly of, exteriorly of, or on, the convex shape. The entrance ends may be configured as a segment of a cylinder. The entrance ends of the fibers may be configured as a slab, and may possibly have a convex surface. A tapered slab waveguide may be used to guide light to the receiver.

The receiver may be a photodiode (49) having an active area, and light may be directed from the exit ends of the fibers toward the active area. A lens (48) may be positioned between the exit ends and the photodiode for directing light toward the photodiode.

In the preferred form, the path of light propagation from the entrance ends to the receiver is substantially the same for each of the fibers, and the lengths of the fibers are substantially the same.

In another aspect, the invention provides an optical reflector assembly (50) for enabling optical communication between a rotor and a stator, the rotor having a longitudinal axis, comprising: a first member (51) having a concave first reflective surface (52), a line (L) in a plane taken through the first reflective surface being configured as a portion of an ellipse having first and second focal points ($F_1$, $F_2$), the first focal point being positioned substantially coincident with the rotor axis; a second member (53) mounted on one side of the first member; a third member (56) mounted on the opposite side of the first member; a fourth member (54) mounted on the second member and having a second reflective surface (55) configured as a portion of a cone, the second reflective surface having a longitudinal axis, the second focal point being positioned substantially on the second reflective surface; and a receiver (58) mounted on the third member such that light seen as originating from the first focal point and being incident on the first reflective surface will be reflected toward the second reflective surface, and such reflected light being incident on the second reflective surface will be further reflected toward the receiver.

The receiver may be substantially aligned with the second reflective surface longitudinal axis.

The first reflective surface is configured and arranged such that the area of second reflective surface upon which light from the first reflective surface is incident is preferably smaller than the area of first reflective surface upon which light from the source is incident. To achieve this, the first reflective surface may be configured as a portion of an ellipsoid.

In one particular form, the first member is a plate-like member having opposite planar surfaces, the second member has a planar surface arranged to engage one of the first member planar surfaces, and the third member has a planar surface arranged to engage the other of the first member planar surfaces. The second and third members may be plate-like members. The second reflective surface may be conical, and may have an apex angle of about 45°.

The receiver may be substantially aligned with the second reflective surface longitudinal axis. The receiver may include receiving optics mounted on the third member and substantially aligned with the second reflective surface longitudinal axis, and a optical fiber having and entrance end arranged to receive light from the receiving optics and having an exit end, and a photodiode arranged at the receiving end. The receiving optics may include an aspheric lens and a ball lens, a pair of aspheric lenses, or the like.

In still another aspect, the invention provides a method of mounting an optical rotary joint on a supporting frame, comprising the steps of: (a) providing a tooling plate (60) having an annular inner portion (61) provided with a plurality of circularly-spaced radially-extending V-grooves (62), and having an arcuate outer portion (63) provided with a plurality of circularly-spaced pockets (64), each pocket being adapted to receive and hold a reflector assembly in a predetermined position relative to the proximate V-grooves; (b) providing a plurality of optical reflector assemblies (50); (c) placing an optical reflector assembly in each pocket; (d) providing a plurality of assembled optical collimators in said tooling plate V-grooves and testing the integrity of the optical connection between said fiber and collimator assembly and the proximate optical reflector assembly; (e) providing a stator segment; (f) placing said stator segment on said optical reflector assemblies; (g) mounting the optical reflector assemblies to the stator segment to form an assembled stator; (h) removing the said assembled stator from the tooling plate; (i) placing cylindrical gauge pins (65) in at least some of the V-grooves; (j) providing a plurality of rotor segments (66), each rotor segment having a plurality of circularly-spaced radially-extending V-grooves; (k) placing the rotor segments such that the gauge pins are received in the rotor segment V-grooves; (l) joining the rotor segments to form an assembled rotor (68); (m) removing the assembled rotor from the tooling plate; (n) inverting said assembled rotor; (o) providing a plurality of fiber and collimator assemblies; (p) mounting said fiber and collimator assemblies in said assembled rotor V-grooves; (q) providing a plurality of brackets; (r) mounting the brackets on the assembled rotor and the stator segment to maintain the alignment of the collimator assemblies with the optical reflector assemblies; (s) mounting the assembled rotor and stator segment on the supporting frame; and (t) removing the brackets; thereby to mount the assembled rotor and stator on the supporting frame in the desired optical alignment with respect to one another.

Accordingly, the general object of the invention is to provide an improved optical rotary joint.

Another object is to provide an improved method of mounting an optical rotary joint on supporting structure so as to maintain a desired alignment between the rotor and stator.

Still another object is to provide an improved optical reflector assembly for use in an optical rotary joint.

These and other objects and advantages will be come apparent from the foregoing and ongoing written specification, the drawings, and the appended claims.

BRIEF DESCRIPTION OF THE DRAWINGS

FIG. 12 is a perspective view of one form of an improved optical reflector assembly.

FIG. 13 is a perspective view of the tooling plate for use in assembling the improved optical rotary joint, this view showing the annular inner portion and the arcuate outer portion provided with five pockets to receive the reflector assemblies.

FIG. 14 is a perspective view, similar to FIG. 13, but showing the optical reflector assemblies as having been placed in the tooling plate outer portion pockets.

FIG. 15 is a perspective view, similar to FIG. 14, but showing the gauge pins as having been placed in the V-grooves and the stator segment as having been placed over the reflector assemblies.

FIG. 16 is a perspective view, similar to FIG. 15, but showing the four rotor segments as having been placed on the gauge pins of the tooling plate inner portion, and having been joined together to form an assembled rotor.

FIG. 17 is a perspective view, similar to FIG. 16, but showing the rotor as having been inverted and secured to the stator assembly using brackets.

DESCRIPTION OF THE PREFERRED EMBODIMENTS

Figure 2:
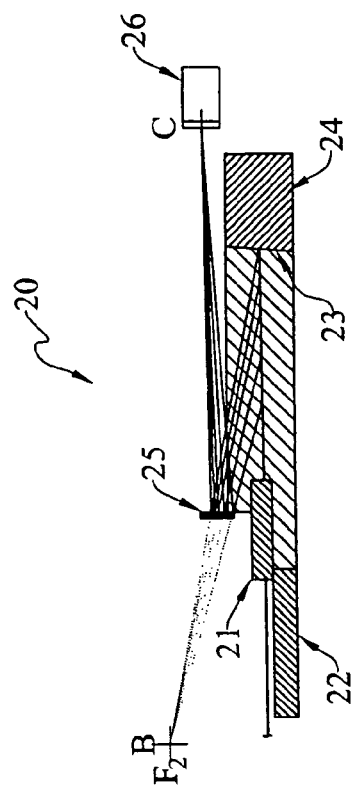
FIG. 2 is a fragmentary sectional view thereof, taken generally on line 2-2 of FIG. 1, this view being substantially the same as FIG. 2 of the '714 patent, but for the differences in the reference numerals.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

In one aspect, the present invention provides an improved optical rotary joint of the constant-path-length elliptical-reflector-based type disclosed in the '714 patent, but having another and different element, namely, a second reflector having a second reflective surface configured as a portion of a cone. The addition of this second reflector enables the improved optical rotary joint: (1) to transmit optical signals at a higher efficiency, (2) to facilitate the transmission of such optical signals into the entrance end of an optical fiber, (3) to allow the number of light sources to be reduced, and (4) to reduce the optical path length from the light sources to the receiver.

While it is still acceptable to use a photodetector as the receiver in high data rate transmission through the rotary joint, it is sometimes desirable, such as in an electrically-noisy environment, to first direct the transmitted signals into the entrance end of an optical fiber that communicates with a remotely-located receiver. It is also desirable to enlarge the acceptance angle for such receiving optical fibers such that smaller number of light sources may be used. A reduction in the number of light sources will lower the manufacturing cost of the improved optical rotary joint. Thus, the invention provides improved optical rotary joints with associated optical assemblies, electronics, and manufacturing methods to transmit optical data through the rotary interface into the entrance end of an optical fiber at an increased acceptance angle, with a reduced path length, and at an increased coupling efficiency.

In another aspect, the invention provides an improved optical rotary joint in which light reflected from an ellipsoidal reflective surface is focused onto an optical slab communicating with the distal divergent ends of a fan-shaped fiber array having a plurality of optical fibers having closely-adjacent divergent entrance ends positioned proximate the second focal point, and having exit ends arranged to guide light toward the receiver.

In another aspect, the invention provides improved optical reflector assemblies for use in such optical rotary joints.

In still another aspect, the invention provides improved methods of assembling an optical rotary joint in an optically-aligned manner, and of mounting such assembled joint on a supporting structure while preserving and maintaining such optical alignment.

These various aspects will be discussed seriatim herebelow.

Figure 6:
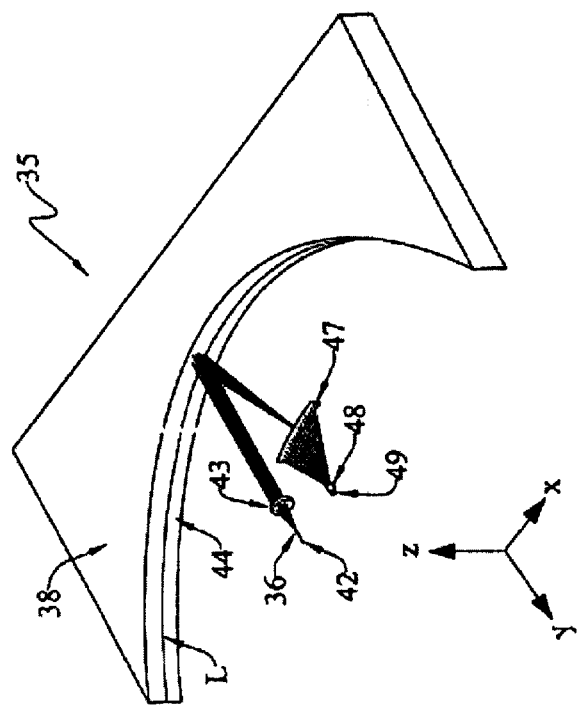
FIG. 6 is a schematic perspective view of the improved optical rotary joint, similar to FIG. 5, in which the optical signals reflected back by the elliptical reflective surface are focused on an arcuate slab communicating with the distal divergent ends of a fan-shaped fiber array.
Figure 5:
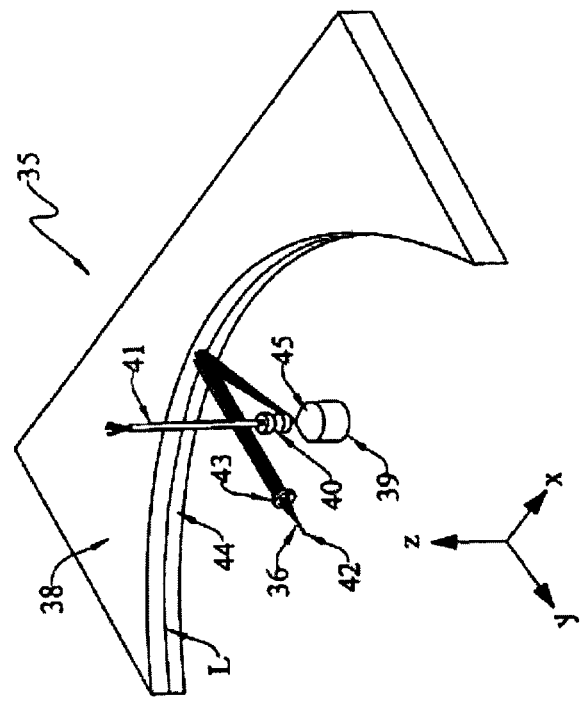
FIG. 5 is a schematic perspective view of the improved optical rotary joint, showing the transmitting optics as transmitting optical signals to an elliptical reflector, at which they reflected to a conical reflector, for re-reflection upwardly through a train of lenses toward the entrance end of an optical fiber communicating with a photodetector.

Improved Optical Rotary Joints (FIGS. 5-6)

FIG. 5 is a conceptual schematic of an improved optical rotary joint, according to the present invention, that is used to provide optical communication across a rotary interface, such as between a rotor and a stator, as previously described. In FIG. 5, the improved optical rotary joint, generally indicated at 35, as depicted as having an optical source 36 mounted on the rotor, a first reflector 38 mounted on the stator, a second reflector 39 also mounted on the stator, and a light receiver including a series of lenses 40 communicating with an optical fiber 41 that leads to a remotely-located photodetector (not shown). In FIG. 5, the light source is depicted as being distal end of an optical fiber 42. The light rays are shown as diverging outwardly from the fiber end, and then passing through a collimator lens 43. After passing through lens 43, the individual rays are slightly diverging as if coming from the focal point, $F_1$ and are directed at the first reflective surface 44 of first reflector 38. This first reflective surface is preferably configured as a portion of an ellipsoid, in that it has compound curvature in each of two orthogonal axes (i.e., x-y, and y-z). The first curvature, depicted by imaginary line L going from end to end in the horizontal direction (i.e., in the x-y plane), is configured as a portion of an ellipse having first and second focal points, $F_1$ and $F_2$, respectively. However, the first reflective surface is also curved in the vertical direction (i.e., in the y-z plane). The compound curvature of the first reflective surface cooperates such that light reflected from an area on first reflective surface 44 converges toward a point-like spot on second reflector 39.

In the disclosed embodiments, the second reflective surface 45 on second reflector 39 is conical. However, the second reflective surface could possibly be frustoconical, or some other portion of a cone. As indicated above, the area of light incident on the second reflective surface is smaller than the area of light incident on the first reflective surface, owing to the compound curvature of the elliptical reflective surface. In the disclosed embodiment, the conical second reflective surface 45 has an apex angle of about 45°. Hence, light incident on second reflective surface 45 is directed upwardly into the train of lenses, indicated at 40. This train may include two plano-convex lenses, two aspheric lenses, a lens and a holographic element, or some other combination of lenses and/or other optical elements. In any event, the function of this train of lenses is to focus light into the entrance end of optical fiber 41, which conveys the light to a distant photodetector (not shown).

The elliptical first reflective surface 44 has first and second focal points, $F_1$, $F_2$, that lie in the plane of line L. The first focal point $F_1$ is positioned substantially coincident with the axis of the rotor. The second focal point $F_2$ is positioned along the axis of the cone 39. Thus, beams seen as originating at first focal point $F_1$ are incident on the elliptical reflective surface 44, and are reflected to converge towards the conjugate focal point $F_2$ inside the cone 39. The second reflective surface further reflects the light upwardly in a direction normal to the rays of light incident thereon.

The second reflector cone may be made of glass, plastic or metal, and may be coated to reflect the maximum amount of light. An optical subassembly is placed above the reflective cone to focus the light into a receiver. The receiver can be a photodetector or an optical fiber. A cone is effective because it collects light from a large area (i.e., the area of the first reflective surface on which the collimated light beams are incident), and directs it upwardly toward the receiver. This convergence and change-in-direction overcomes the traditional limited-acceptance angle of an optical fiber, and allows the receiving fiber to accept light signal from the extended area of the elliptical reflective surface. In the disclosed embodiment, the second reflector is configured as a cone, and has an apex angle of 45° such that the light rays will be reflected in a direction perpendicular to the direction of the rays incident thereon. While preferred, this arrangement is not invariable. In appropriate cases, the second reflective surface might possibly be frusto-conical and/or might have an apex angle of other than 45°.

The optical subassembly that focuses light from the cone toward the receiver may include a train of lenses, or a combination of lenses and a holographic element. In FIG. 5, two plano-convex lenses are used to focus the reflected beam from the cone into an optical fiber. This optical subassembly can also consist of a lens and a volume hologram that diffracts light into the receiving fiber. Alternatively, the subassembly can be an array of ball lenses arranged around the axis of the cone. If the receiver needs to be mounted horizontally, a right-angle prism can be mounted between the two lenses to turn the further-reflected beams from the cone by 90°. If the light needs to be directed at some other angle, then a mirror, a prism of some other appropriate shape, or the like, may be used.

FIG. 6 is a variant form of the improved optical rotary joint. In this form, the light reflected from the ellipsoidal first reflective surface 44 is focused to converge on the arcuate slab that communicates with the divergent ends of a fan-shaped array of optical fibers. Light entering these fibers is directed therealong, and is discharged at the convergent ends thereof through a collimating lens 48 to a photodetector 49.

There are many advantages of these improved optical rotary joints. Such devices have substantially constant optical path lengths from the source to the receiver that are independent of the relative positions of the rotor and stator. This constant path length enables multiple optical signals to be superimposed in the receiver without phase distortion. When a higher data transmission rate is desired and lasers that support such a higher data rates do not have sufficient power, multiple optical sources can be stacked to increase the optical power reaching the photodetector.

Moreover, the improved optical rotary joint is independent of both the wavelength and the data transmission rate of the signals. The selection of the wavelength for use with this device depends on the availability of the laser source, the photodetector, and the optical fiber that carries the optical signal. However, the improved optical rotary joint itself is data transmission rate-independent, and data transmission rates ranging from DC through high gigabit/second can be used. Finally, wavelength division multiplexing can be used to transmit multiple optical channels across the rotary joint when even higher data rates are desired.

The improved optical rotary joints disclosed herein have additional benefits over the device described in the '714 patent. The improved joints: (a) reduce the variation of light intensity variation incident on the face of the receiver, (b) reduce the effect of the acceptance angle of the elliptical reflector, (c) allow the use of an optical fiber ahead of the photodetector, and (d) reduce the optical path length.

Figure 8:
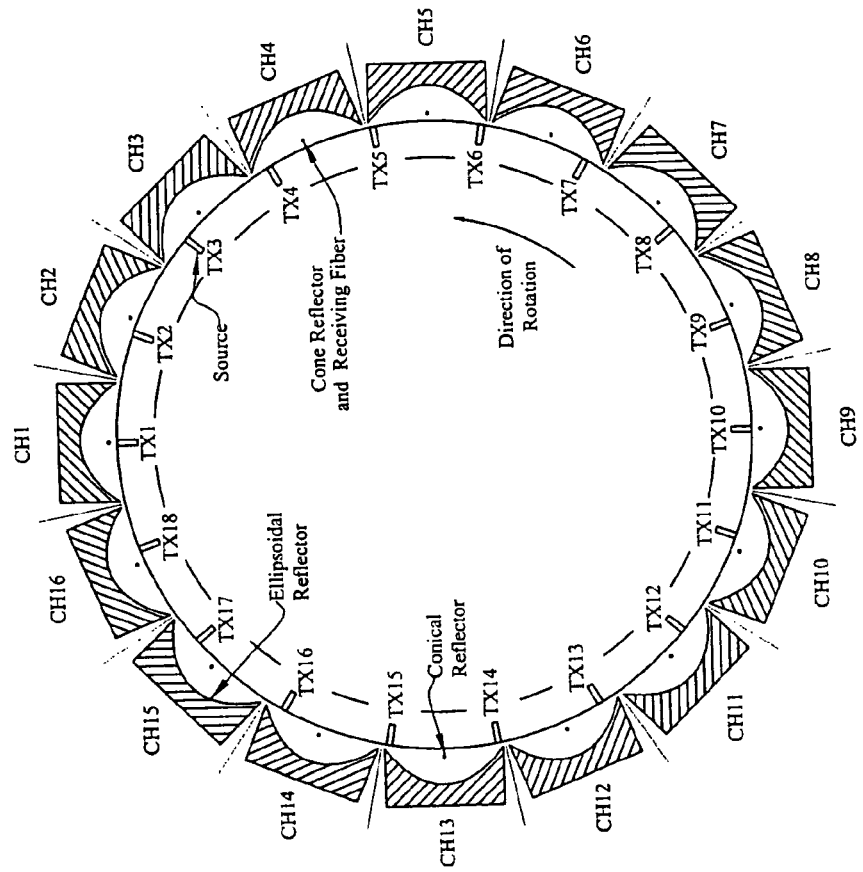
FIG. 8 is a schematic view of the architecture for transmitting data at the rate of 80 Gbit/sec through the improved optical rotary joint.
Figure 7:
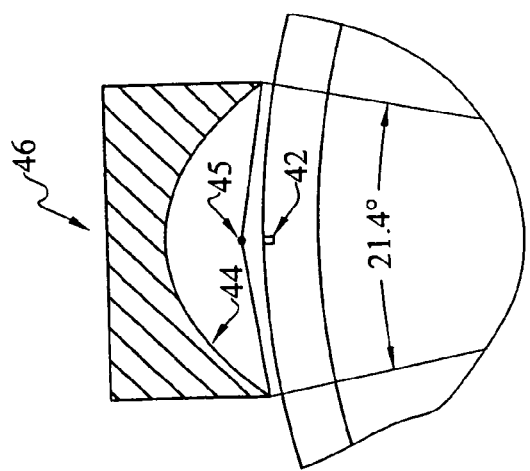
FIG. 7 is a schematic view showing the wider acceptance angle for the received signal in FIG. 5.

These advantages are illustrated in FIGS. 7 and 8. In FIG. 7, an optical reflector assembly, generally indicated at 46, is schematically shown as including an ellipsoidal first reflective surface 44 and a conical second reflective surface 45, as previously described. Light signals are generated from sources 42. In FIG. 8, these various signal-transmitting light sources are severally indicated at TX1, TX2, . . . , TX18, and the various optical reflector assemblies are severally indicated at CH1, CH2, . . . , CH16, there being one reflector assembly per channel.

Figure 1:
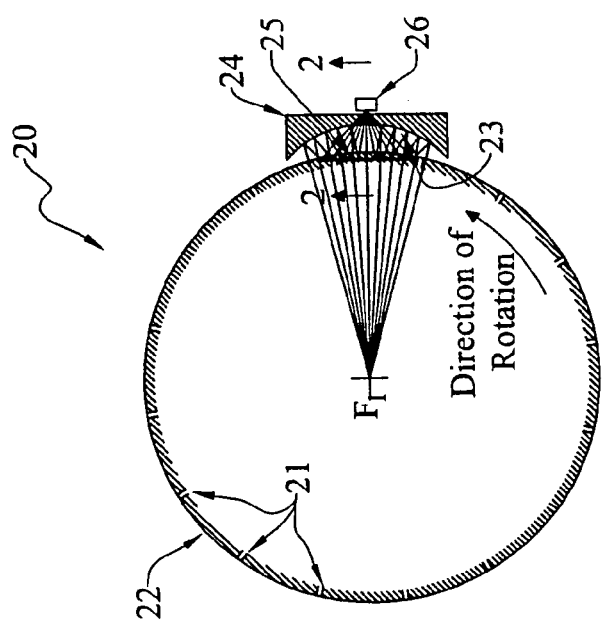
FIG. 1 is a schematic representation of an prior art optical rotary joint including a reflector assembly having an elliptical reflector and a hyperbolic reflector, this view being substantially the same as FIG. 1 of the '714 patent, but for the differences in the reference numerals.

In a simple elliptical reflector configuration, such as disclosed in FIG. 1 of the '714 patent, the position of the light source relative to the elliptical reflector produces reflected beams with different angles of incidence on the receiver. A beam incident on the elliptical reflector near its edge converges at a greater angle of incidence with respect to the normal to the surface of the receiver, than do those at near the center. Since the sensitivity of the receiver drops off as a function of the angle of incidence (i.e., the angle which the incident beam makes with a line normal to the surface on which the beam is incident), a beam with a larger angle of incidence causes the receiver to generate a smaller output signal.

In the present invention, the elliptical first reflecting surface is preferably a portion of an ellipsoid. Hence, the compound nature of this ellipsoidal surface focuses the area of light incident thereon to a spot on the conical second reflective surface, as shown in FIG. 5. The light converging toward this spot is further reflected upwardly toward the receiver. Hence, the further-reflected signal does not show a meaningful change in the angle of incidence at the receiver at different locations of the source relative to the stator. As a result, the signal detected by the receiver is substantially independent of the angle of incidence of light incident on elliptical first reflective surface 44, and is substantially independent of the position of the rotor relative to the stator. As a result, the number of sources used around the rotor can be reduced and minimized. The reduced drop off near the edges of the elliptical reflector is important because this helps to improve the minimum signal produced by the photodetector. The photodetector produces a minimum signal when a beam from one light source is just about to leave the reflector and a beam from an adjacent light source is just entering into the reflector. An increase in overlapping near the edges of the reflector increases the amplitude of the superimposed light signals, and hence the signal produced by the detector, and thus reduces the number of sources needed in the improved optical rotary joint.

An additional advantage of the present invention is in allowing the use of an optical fiber upstream of the receiver. In the 714 patent, use of an optical fiber ahead of the receiver was seen to be hampered by the limited NA of the fiber. As described herein, the improved compound elliptical reflective surface focuses the reflected light to a spot on the second reflective surface. The conical reflector surface is used to turn the reflected beams from the elliptical reflector toward the receiver. Through the use of the cone reflector, the angle of incidence with respect to the normal of the receiver surface is substantially constant throughout the entire angle subtended by the elliptical reflector. An additional optical subassembly above the cone may be used to focus the convergent reflected beams into the entrance end of the receiving fiber. The use of such an optical fiber can be particularly useful in areas where a high degree of electrical noise is present at the rotary interface, or when it is desirable for remote detection of the signal. The use of a cone reflector enlarges the effective acceptance angle of the rotary joint. As shown in FIG. 7, the acceptance angle for the rotary joint is increased to about 21.4°. With this larger acceptance angle, a minimum of seventeen light sources is needed for continuous trans-mission of signal across the rotary interface (i.e., 360°/21.4°=16.82≈17 sources).

Figure 4:
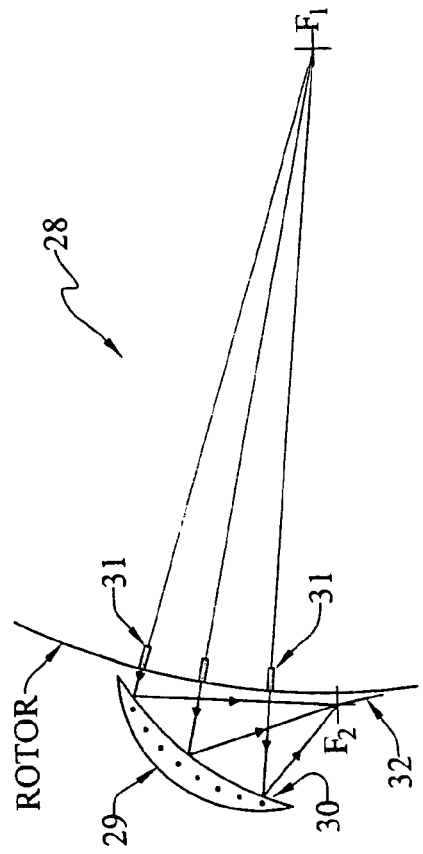
FIG. 4 is a schematic representation of another form of prior art optical rotary joint that includes an elliptical reflector arranged to reflect light emanating from a source at focal point $F_1$ to the entrance end of an optical fiber positioned at focal point $F_2$, this view being substantially the same as FIG. 4 of the '714 patent, but for the differences in the reference numerals.
Figure 3:
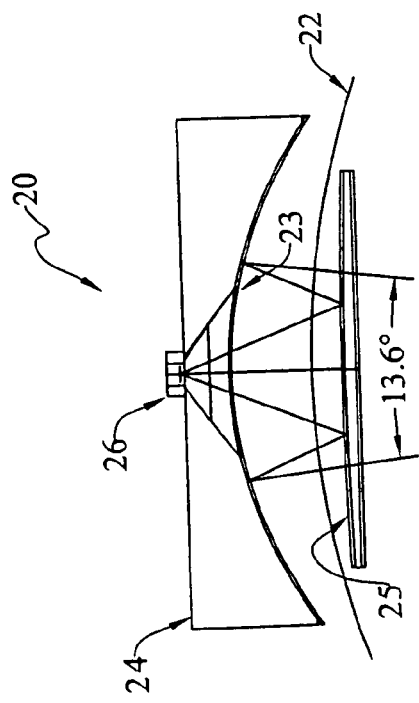
FIG. 3 is a top plan view of the prior art optical rotary joint shown in FIGS. 1 and 2, this view showing the limited acceptance angle of the elliptical reflective surface for a receiver using an optical fiber.

The third advantage of using the cone reflector is in reducing the optical path length. Using geometric analysis, the optical path length in the configuration shown in FIG. 7 is about 120 mm, which is significantly less than optical path lengths (i.e., about 248 mm) in the configurations of FIGS. 1 and 4. The reduced optical path length reduces the sensitivity of the improved optical rotary joint to misalignments.

By insuring that the optical path length is substantially constant throughout the entire angle occupied by the elliptical reflector and that sufficient optical power is directed into the receiving fiber through the reflection from the cone, the optical rotary joint of the present invention can support data transmission at data rates of 5.0 Gbit/sec or more per channel. One data channel consists of one elliptical reflector, a cone reflector, a subassembly of receiving optics, a receiving fiber, and a high speed photodetector. Using an array of data channels and the technique of switching data carried by the sources around the rotor, very high data transmission rates can be achieved. An example is provided in FIG. 8, in which sixteen data channels are arranged around the circumference of the rotary interface. Each of the data channels can carry optical data at a rate of 5.0 Gbit/sec. By summing the sixteen data channels, an optical rotary joint capable of passing 80 Gbit/sec (i.e., 16 channels×5.0 Gbit/sec/channel=80 Gbit/sec) can readily be achieved using the present architecture.

For example, as shown in FIG. 8, a fiber optic rotary joint includes eighteen sources, TX1 through TX18, respectively, spaced equally around the circumference of the rotor at nominal interval angles of 20°. The sources can emit the same optical signal, or different optical signals, as desired. In order to transmit the maximum amount of data across the rotary interface, most of the sources carry different signal streams. The stator in the improved optical rotary joint is divided into sixteen sectors. A sector contains one data channel, and the sector boundaries are marked by the radial hash marks shown in FIG. 8. Before a source enters a waveguide, it is selectively switched to provide the optical signal for that particular data channel. For example, source TX1 carries the optical data for channel CH1, source TX2 carries a different set of data for channel CH2, and so on. Where two sources are within one sector, both sources are switched to carry the same data signal. For example, in FIG. 8, sources TX5 and TX6 both carry the same signal for channel CH5. Because of the constant path length property of the rotary interface, the optical signals from sources TX5 and TX6 can be superimposed constructively, and the detector receives a stronger in-phase signal from the two sources. Thus, the superposition of the two signals improves the quality of the superimposed amplitude-summed optical signals by increasing the optical intensity of the two separate in-phase signals arriving at the photodetector.

Figure 9:
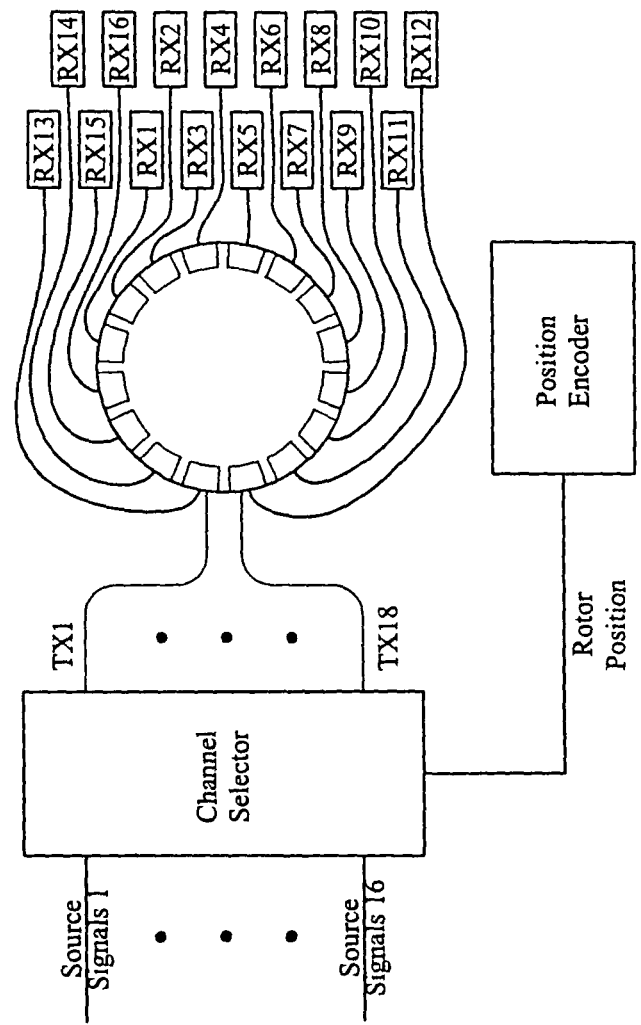
FIG. 9 is a schematic view of the electronic implementation to switch the optical signal at different rotor positions, for carrying a large data transmission rate across the rotary interface.
Figure 11:
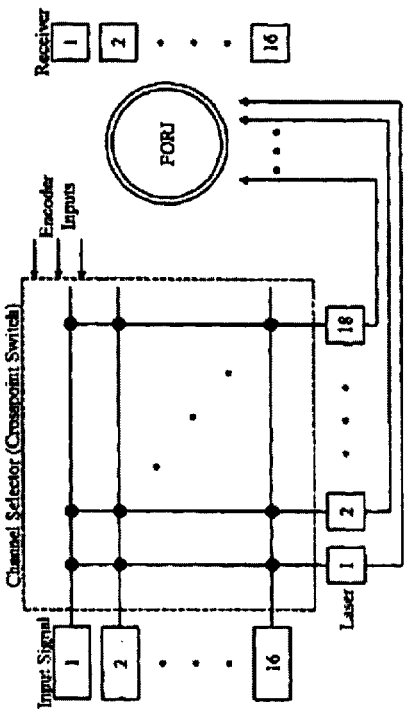
FIG. 11 is a schematic view showing the use of a crosspoint switch to achieve channel selection.
Figure 10:
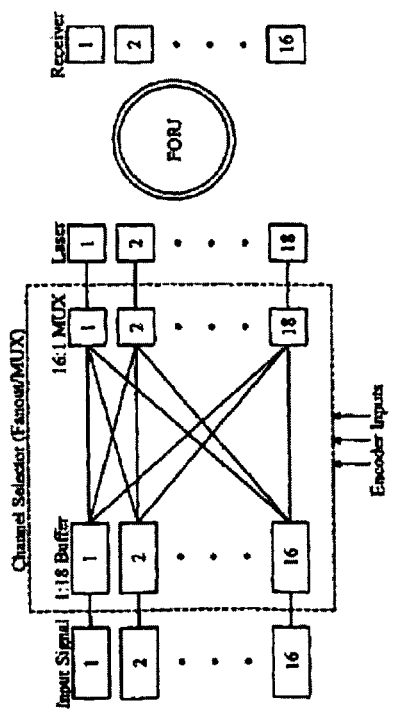
FIG. 10 is a schematic view showing the use of a buffer/multiplexer to achieve channel selection.

Electronic Switching (FIGS. 9-11)

FIG. 9 illustrates the manner by which the improved optical rotary joints may be utilized to transmit data at a high transmission rate. Upstream of the optical rotary joint, an 80 Gbit/sec signal is divided or deconstructed into sixteen 5.0 Gbit/sec signal streams utilizing conventional digital electronics. The sixteen 5.0 Gbit/sec signal streams are routed via the channel selector to different respective groups of optical sources, TX1 through TX18, respectively, for transmission across the rotary joint to sixteen receivers, RX1 through RX16, respectively. If more than eighteen optical sources are used, then more than sixteen transmission channels can be established. After the signals have been received, they are reconstructed to re-form the original 80 Gbit/sec signal.

The optical rotary joint of this embodiment may include an angular position encoder to track the location of the rotor relative to the stator such that the channel selector can appropriately switch the various 5.0 Gbit/sec signal streams to their respective sources. Thus, the fiber optic rotary joint of the present invention can readily transmit optical signals at extremely high data rates.

It is important to note that a 5.0 Gbit/sec signal is not the bandwidth limit of the rotary joint. In fact, any data rate up to 5 Gbit/sec could be utilized and when the electronics are readily available, data rates of 10 Gbit/sec and higher can be implemented.

In another embodiment, the transmitter could accept a plurality of lower data rate signals, which are then multiplexed together to achieve a higher data rate around 5 Gbit/sec. This data stream could be sent across the rotary joint and reconstructed into the lower data rate signals.

Two approaches are available for causing the channel selector to switch the sixteen channels of source signals to the eighteen optical sources around the rotor. The first approach involves a buffer/multiplexer method as described in the U.S. Pat. No. 6,385,367, the aggregate disclosure of which is hereby incorporated by reference. A schematic of this method is shown in FIG. 10.

According to this approach, each of the sixteen signals is fed into a separate 1-to-18 buffer, which fans out the input signal into one of the eighteen multiplexer (MUX) channels. Eighteen MUX channels having sixteen inputs are employed to receive the inputs from each of the buffer chips. The rotor position encoder provides the locations at which the lasers are switched to carry data from another input signal stream.

While this approach generally works, when the number of input channels increases, the number of interconnections between the fanout/buffer chips to the MUX chips increases significantly. For example, if there are M input signal streams and the number of sources around the rotor ring is N, the number of interconnections ($N_{interconnects}$) is:

$$N_{interconnects} = 2M \times N.$$

The increase in the number of interconnections increases the complexity of the printed circuit board, and further spatially separates the chips which may introduce waveform distortion because of the length of the transmission lines. The large number of buffers and other ICs increases the amount of propagation delay variation that is observed between the various paths. When these signals are added together at the optical detector, the variation in propagation delay causes the waveform to be distorted and the observed eye pattern to close.

Another approach for channel selection can be achieved by using a non-blocking crosspoint (crossbar) switch, as shown in FIG. 11. An M×N crosspoint switch has the advantage that all the interconnections is based on crosspoint switches, and the interconnections are all integrated into the chip. Thus, no external interconnections are needed. An M×N crosspoint switch has the ability to spatially connect any one of the M inputs to any of the N outputs, and its functional schematic is shown in FIG. 11. A non-blocking switch insures that all inputs can be connected to the respective outputs, and no transmission will be blocked by the other connections. The multicast capability enables one input to connect to multiple outputs at the same time, while insuring each output is connected to only one input.

A number of advantages result from use of a crosspoint switch. These include reducing the board size and chip count, reducing power consumption, and minimizing signal distortion. For example, in a typical four-input channel transmitter board, by employing a crosspoint switch over the buffer/MUX approach, the size of the board may be reduced by about 30%, the number of chips may be reduced by over 20%, and the power consumption may be reduced by more than 40%. Because of the integration of the switches into one die, the crosspoint switch generally minimizes the signal distortion and reduced jitter, as compared to the buffer/MUX approach. In fact, the variation in propagation delay in the crosspoint switch-based transmitter can be reduced by over 80% over the buffer/MUX approach. This allows higher data transmission rates through the rotary interface. Another benefit of the crosspoint switch is the added flexibility of transmitted data patterns. Because the crosspoint switch is transparent to data rates and protocol, multiple transmission channels can be established with each carrying a unique protocol at various data rates.

Improved Optical Reflector Assemblies (FIG. 12)

Referring now to FIG. 12, an improved optical reflector assembly is generally indicated at 50. The improved reflector assembly is shown as having three plate-like members sandwiched together, as described infra. The first or middle member 51 is shown as having an ellipsoidal reflective surface 52, as previously described. This intermediate member has a planar upper surface and a planar lower surface.

The reflector assembly also includes a lower second member 53. This is also a plate-like member, and has a planar upper surface engaging the planar lower surface of the intermediate first member 51. The second member 53 is shown as supporting a fourth member 54 having a conical reflective surface 55. The second focal point of the ellipsoidal surface is substantially located on the axis of the cone object 54. The reflector assembly is further shown as including a plate-like third member 56. This third member has a planar lower surface that engages the planar upper surface of intermediate member 51. The third member is shown as supporting the receiving optics, generally indicated at 58, which communicates via an optical fiber 59 with a remotely-located photo detector (not shown). The receiving optics may be a series or train of lens, to focus light into the entrance end of fiber 59.

The improved optical reflector assembly is thus simple to manufacture and construct. Of course, care must be taken in forming the ellipsoidal reflective surface 52 on the first member. The lower second member is shown as providing a support for the conical reflector, and the upper third member is shown as providing a suitable support for the receiving optics, which are aligned with the conical reflector. The device shown in FIG. 12 operates substantially as previously described. The ellipsoidal surface as a first focal point which is substantially coincident with the rotary axis. Thus, light which is seen as coming from the rotor axis, can be reflected from surface 52 to a spot on conical reflective surface 55, and then be re-reflected upwardly through the receiving optics into optical fiber 59. The device shown in FIG. 12 will operate substantially as schematically shown in FIG. 5.

Improved Mounting Methods (FIGS. 13-17)

Referring now to FIGS. 13-17, this invention also provides, in another aspect, improved methods of assembling an optical rotary joint, and mounting such an assembled rotary joint on a supporting frame.

This method begins with the provision of a tooling plate, generally indicated at 60, having an annular inner portion 61 provided with a plurality of circularly-spaced radially-extending V-grooves, several indicated at 62, and having an arcuate outer portion 63 provided with a plurality of circularly-spaced pockets, severally indicated at 64. Each pocket is adapted to receive a reflector assembly, such as previously indicated at 50 in FIG. 12, and to hold position such reflector assembly in a predetermined position relative to the proximate V-grooves. Thus, FIG. 13 simply depicts the upper surface of the tooling plate. Great care is taken in machining the tooling plate, and this assembly is preferably of a unitary one-piece construction.

The next step then is to provide a plurality of optical reflector assemblies, such as indicated at 50 in FIG. 12.

Referring now to FIG. 14, the next step then is to physically place an optical reflector assembly 50 in each pocket. The pockets are preferably machined such that the optical reflector assembly will be received in only one way, and that the reflector assembly will be properly oriented with respect to the V-grooves on the tooling plate inner part. Continuing to refer principally to FIG. 15, a stator segment 69 is then provided, and this is placed on top of the optical reflector assemblies. The optical reflector assemblies is then mounted to the stator segment to form an assembled stator. The assembled stator is now removed from the tooling plate.

The next step then is to place cylindrical gauge pins in at least some of the tooling plate V-grooves, as shown in FIG. 15. The various gauge pins are indicated at 65.

Thereafter, a plurality of rotor segments, severally indicated at 66 are provided. These are positioned on top of the tooling plate inner part. Each rotor segment has a radially-extending V-groove that is adapted to be aligned with the V-grooves in the tooling plate. Thus, as the various rotor segments are placed on the cylindrical gauge pins, they will be properly orientated with respect to one another.

Thereafter, the rotor segments are joined to form an assembled rotor, generally indicated at 68 in FIG. 16.

The assembled rotor is then removed from the tooling plate, and the gauge pins are removed from the tooling plate V-grooves. The assembled rotor is then inverted, and attached to the assembled stator through the use of a plurality of precision machined brackets. A plurality of fiber and collimator assemblies are then provided, and these are mounted in the assembled rotor V-grooves.

The assembled rotor and stator segment are thereafter mounted on a supporting frame, such as on the gantry of a CT-scan machine. Thereafter, the brackets are subsequently removed such that the assembled rotor and stator will be mounted on the supporting frame in the desired alignment with respect to one another.

If desired, the method may comprise the additional steps of placing a test fiber and collimator assembly in one of the tooling plate V-grooves in FIG. 14; and testing the integrity of the optical connection between this optical fiber and collimator assembly and the proximate reflector assembly before removing the assembled rotor from the tooling plate.

Figure 18:
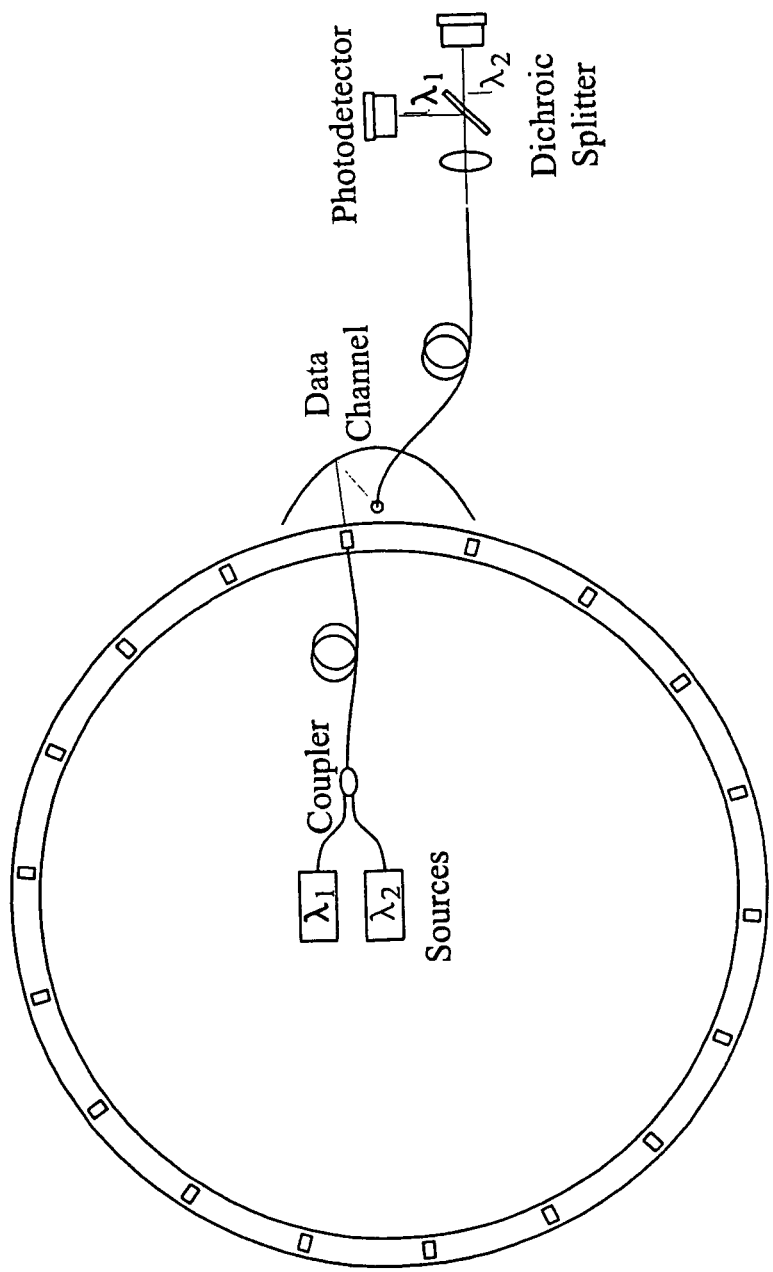
FIG. 18 is a schematic view showing the use of a wavelength division multiplexing technique to multiply the bandwidth of the data transmitted through the improved optical rotary joint.

Wavelength Division Multiplexing (FIG. 18)

The fiber optic rotary joint of the present invention also supports the transmission of optical signals having different wavelengths, as depicted in FIG. 18. In this embodiment, the fiber optic rotary joint includes two or more lasers or other light sources for providing optical signals having different respective wavelengths. The optical rotary joint of this embodiment may also include separate same-length optical fibers for trans-mitting the different-wavelength optical signals from the respective lasers or other light sources to the rotary interface. Alternatively, the optical source may include a fiber coupler, as also shown in FIG. 18, for combining the optical signals having different wavelengths such that the combined optical signals can be transmitted to the rotary interface by means of a common optical fiber.

In this embodiment in which optical signals having different wavelengths have been combined, the receiver may be configured to include a splitter, such as a dichroic filter, for separating the different-wavelength optical signals, and to include a plurality of photodiodes or other detectors for receiving the separated optical signals. In the embodiment in which the receiver is remote from the rotary interface, the different-wavelength optical signals propagate along a common optical fiber prior to being collimated, such as by a collimating lens, and then split in accordance with the wavelength of the optical signals.

By utilizing wavelength multiplexing, the bandwidth may be increased without increasing the modulation rate of the optical sources. Since the costs associated with increasing the modulation rate of the optical sources may be substantial at larger data rates, the inclusion of two or more sets of lasers or other sources that provide optical signals with different wavelengths may sometimes be more economical. Using this technique, an optical rotary joint capable of transmitting data at a rate on the order of 160 Gbit/sec can be achieved by using two wavelengths.

Modifications

The present invention contemplates that various changes and modifications may be made. For example, the first reflective surface should be configured as a portion of an ellipse having first and second focal points. This surface is preferably configured as a portion of an ellipsoid in that it has a compound curvature in two perpendicular orthogonal axes, such that the area on the ellipsoidal surface on which light is incident will be reflected toward, and will converge at a spot on the conical reflector.

As used herein, the second reflector is shown as being a cone, and has a 45° apex angle. However, this is not invariable. In some situations, the second reflector may be frusto-conical, or may have some other configuration of a portion of a cone. In any event, the salient here is that the function of the conical reflector is to re-reflect light in a different direction toward receiving optics, which may include a train of lenses or the like. Alternatively, the re-reflected light may be incident directly on the operative surface of a photo detector.

The various materials of construction may be changed, as will be readily appreciated by persons skilled in this art. The various reflective surfaces may be coated and/or polished to provide a high degree of reflectivity.

Therefore, while several aspects and embodiments of the present invention have been shown and described, and various modifications thereof suggested and discussed, persons skilled in this art will readily appreciate that various additional changes and modifications may be made without departing from the spirit of the invention, as defined and differentiated by the following claims.

What is claimed is:

1. The method of mounting an optical rotary joint on a supporting frame, comprising the steps of:
   (a) providing a tooling plate (60) having an annular inner portion (61) provided with a plurality of circularly-spaced radially-extending V-grooves (62), and having an arcuate outer portion (63) provided with a plurality of circularly-spaced pockets (64), each pocket being adapted to receive a reflector assembly in a predetermined position relative to the proximate V-grooves;
   (b) providing a plurality of optical reflector assemblies (50);
   (c) placing an optical reflector assembly in each pocket;
   (d) providing a plurality of assembled optical collimators, each assembled optical collimator having a fiber and a collimator assembly;
   (e) placing said plurality of assembled optical collimators in said tooling plate V-grooves;
   (f) testing the integrity of the optical connection between said fiber and collimator assembly and the proximate optical reflector assembly;
   (g) providing a stator segment;
   (h) placing said stator segment on said optical reflector assemblies;
   (i) mounting the optical reflector assemblies to the stator segment to form an assembled stator;
   (j) removing the said assembled stator from the tooling plate;
   (k) placing cylindrical gauge pins (65) in at least some of said V-grooves;
   (l) providing a plurality of rotor segments (66), each rotor segment having a plurality of circularly-spaced radially-extending V-grooves;
   (m) placing said rotor segments such that said gauge pins are received in said rotor segment V-grooves;
   (n) joining said rotor segments to form an assembled rotor (68);
   (o) removing said assembled rotor from said tooling plate;
   (p) inverting said assembled rotor;
   (q) providing a plurality of fiber and collimator assemblies;
   (r) mounting said fiber and collimator assemblies in said assembled rotor V-grooves;
   (s) providing a plurality of brackets;
   (t) attaching said assembled rotor to said assembled stator using said brackets;
   (u) mounting said assembled rotor and said assembled stator on said supporting frame; and
   (v) removing said brackets;
   thereby to mount said assembled rotor and stator on said supporting frame in the desired alignment with respect to one another.

2. The method of mounting an optical rotary joint on a supporting frame as set forth in claim 1 wherein said supporting frame is the gantry of a CT-scan machine.

* * * * *